United States Patent
Kim et al.

(10) Patent No.: US 11,613,631 B2
(45) Date of Patent: Mar. 28, 2023

(54) RUBBER COMPOSITION FOR TIRE TREAD AND TIRE MANUFACTURED BY USING THE SAME

(71) Applicant: HANKOOK TIRE & TECHNOLOGY CO., LTD., Seongnam-si (KR)

(72) Inventors: Ii Jin Kim, Busan (KR); Ki Hyun Kim, Daejeon (KR); Hyung Jae Lee, Daejeon (KR); Won Ho Kim, Busan (KR); Byung Kyu Ahn, Busan (KR); Dong Hyuk Kim, Busan (KR)

(73) Assignee: HANKOOK TIRE & TECHNOLOGY CO., LTD., Seongnam-si (KR)

( * ) Notice: Subject to any disclaimer, the term of this patent is extended or adjusted under 35 U.S.C. 154(b) by 173 days.

(21) Appl. No.: 17/111,963

(22) Filed: Dec. 4, 2020

(65) Prior Publication Data

US 2021/0179823 A1 Jun. 17, 2021

(30) Foreign Application Priority Data

Dec. 11, 2019 (KR) .................. 10-2019-0164494

(51) Int. Cl.
*C08L 9/06* (2006.01)
*B60C 1/00* (2006.01)
*B60C 11/00* (2006.01)

(52) U.S. Cl.
CPC .............. *C08L 9/06* (2013.01); *B60C 1/0016* (2013.01); *B60C 11/0008* (2013.01); *B60C 2011/0025* (2013.01)

(58) Field of Classification Search
CPC .......... C08L 9/06; C08L 2205/02; C08L 9/00; C08L 15/00; B60C 1/0016; B60C 11/0008; B60C 2011/0025; C08F 36/06; C08F 2/001; C08F 2/04; C08F 8/42; C08F 236/10; C08C 19/25; C08C 19/44; C08K 3/36

See application file for complete search history.

(56) References Cited

U.S. PATENT DOCUMENTS

2020/0332089 A1* 10/2020 Kanbara .................. C08L 9/00

FOREIGN PATENT DOCUMENTS

| DE | 102015218745 A1 | | 3/2017 |
|---|---|---|---|
| JP | 2002114874 | * | 4/2002 |
| JP | 2002114874 A | | 4/2002 |
| JP | 2003 012860 A | | 1/2003 |
| JP | 2006 143804 A | | 6/2006 |
| JP | 2008063364 A | | 3/2008 |
| JP | 2015221884 A | | 12/2015 |
| KR | 10 1125559 B1 | | 3/2012 |
| KR | 10 2013 0074499 A | | 7/2013 |
| KR | 20130074499 | * | 7/2013 |
| KR | 10 2014 0058171 A | | 5/2014 |
| KR | 20160057069 A | | 5/2016 |
| WO | 2016/199915 A1 | | 12/2016 |
| WO | 2019/044889 A1 | | 3/2019 |
| WO | 2019044891 A1 | | 3/2019 |
| WO | WO 2019/044889 | * | 3/2019 |

OTHER PUBLICATIONS

Machine translation of JP 2002-114874 (Year: 2002).*
Machine translation of KR 2013-0074499 (Year: 2013).*
Office Action issued in related JP patent application serial No. 2020-202763 dated Dec. 21, 2021, with English Machine Translation.
Office Action issued in related KR patent application serial No. 10-2019-0164494, dated Sep. 17, 2020.
Extended European Search Report issued in related EP patent application serial No. 20212938.3 dated Apr. 23, 2021.
Office Action issued in related JP patent application serial No. 2020-202763 dated Aug. 8, 2022, with English Machine Translation.

* cited by examiner

*Primary Examiner* — Doris L Lee

(74) *Attorney, Agent, or Firm* — Westman, Champlin & Koehler, P.A.; Amanda M. Prose

(57) ABSTRACT

Provided is an all-season tire tread rubber composition in which braking performance and wear performance are secured at the same time. A rubber composition for tire tread according to the present disclosure comprises: 100 parts by weight of raw rubber comprising solution polymerized styrene-butadiene rubber which has a styrene content of 20 to 30 wt % and a vinyl content within butadiene of 20 to 30 wt %, and is manufactured by a continuous method; 90 to 110 parts by weight of silica; and 20 to 40 parts by weight of modified liquid butadiene rubber.

3 Claims, No Drawings

RUBBER COMPOSITION FOR TIRE TREAD AND TIRE MANUFACTURED BY USING THE SAME

CROSS REFERENCE TO RELATED APPLICATIONS

This application claims priority to and the benefit of Korean Patent Application No. 10-2019-0164494 filed in the Korean Intellectual Property Office on Dec. 11, 2019, the entire contents of which are incorporated herein by reference.

BACKGROUND OF THE DISCLOSURE

Field of the Disclosure

The present disclosure relates to a rubber composition for tire tread and a tire manufactured by using the same and, more particularly, to a rubber composition for tire tread, which can be used as an all-season tire tread rubber composition by improving wear performance while also greatly improving braking performance on an ice and snow road surface, and a tire manufactured by using the same.

Related Art

Generally in Europe, summer tires with improved braking performance on a wet road surface have been used in the summer time, and tires with greatly improved braking performance on an ice and snow road surface have been replaced with the summer tires and used in the wintertime. Since characteristics of a rubber composition required in braking performances on a dry or wet road surface and an ice and snow road surface are contrary to each other, the other will be bound to be at a disadvantage if one performance is chosen.

There has been a need for continuous improvement in fuel efficiency performance in this environment, and with the implementation of a labeling system grading fuel efficiency performance and braking performance on a wet road surface in 2012, technical development satisfying both fuel efficiency performance and braking performance at the same time has been carried out continuously.

Although, with the recent acceleration of global warming, there are times when annual snowfall declines sharply and snow falls to form icy roads throughout the world, all-season tires which are not only excellent in braking performance on an ice and snow road surface, but also are excellent in braking performance on a wet road surface have been increasingly used as there is a growing number of days when snow melts to become a slush state, or when rain falls to form a wet road surface. Further, consumers' needs have continuously been increased since there is no need to change the tires according to the season if all-season tires are used.

However, it is essential to improve wear performance of all-season tires with improved braking performance on an ice and snow road surface as the tires are continuously used without replacing the tires according to the season.

In particular, since braking performance is an issue which is directly related to the stability of an automobile, and wear performance is an issue which is directly related to consumers' economic feasibilities and is a major concern for tire manufacturers, research and development have actively been carried out to resolve the issues.

A method of improving braking performance on a dry or wet road surface by using a styrene-butadiene rubber with a high styrene content in a winter-tire tread rubber composition has conventionally been used, thereby increasing the glass transition temperature of the rubber composition in order to resolve such issues. However, since the hardness and modulus of rubber at low temperatures rise as the styrene content increases, there is a problem that braking performance on an ice and snow road surface is lowered.

In addition, a method of using silica as a reinforcing agent has been widely used, Wherein silica has an advantage also in braking performance on an ice and snow road surface since it is excellent in braking properties on a dry or wet road surface by having excellent reinforcement properties compared to carbon black, and has a lower increase rate of the hardness and modulus due to reduced temperatures compared to carbon black by having a weak temperature dependence at low temperatures. However, simply replacing carbon black with silica as the reinforcing agent in a winter-tire tread rubber composition does not improve braking performance on a wet road surface very effectively.

Further, although there is a method which not only has excellent braking performance on dry and wet road surfaces, but also lowers rolling resistance while greatly improving braking performance on an ice and snow road surface using liquid butadiene, meeting all the consumers' needs remains as a difficult technical task since wear performance according to the use of liquid butadiene is not effectively improved.

SUMMARY

The present disclosure provides a rubber composition for tire tread, which can be used as an all-season tire tread rubber composition by greatly improving wear performance while also greatly improving braking performance on an ice and snow road surface.

The present disclosure also provides a tire manufactured by using the rubber composition for tire tread.

In an aspect, a rubber composition for tire tread, the rubber composition comprising: 100 parts by weight of raw rubber comprising solution polymerized styrene-butadiene rubber which has a styrene content of 20 to 30 wt % and a vinyl content within butadiene of 20 to 30 wt %, and is manufactured by a continuous method; 90 to 110 parts by weight of silica; and 20 to 40 parts by weight of modified liquid butadiene rubber, is provided.

The modified liquid butadiene rubber may have a weight average molecular weight of 5,000 to 50,000 g/mol, a glass transition temperature of −90 to −100° C. and a vinyl content of 10 to 20 wt %, and may be modified within a rubber chain by using silicate.

The silicate may be one selected from the group consisting of tetramethyl orthosilicate (TMOS), tetraethyl ortho silicate (TEOS), and a mixture thereof.

In the other aspect, a tire manufactured by using the rubber composition for tire tread is provided.

DESCRIPTION OF EXEMPLARY EMBODIMENTS

Hereinafter, the present disclosure will be described more in detail.

A rubber composition for tire tread according to an embodiment of the present disclosure comprises 100 parts by weight of raw rubber, 90 to 110 parts by weight of silica, and 20 to 40 parts by weight of liquid butadiene rubber.

The raw rubber comprises solution polymerized styrene-butadiene rubber which has a styrene content of 20 to 30 wt % and a vinyl content within butadiene of 20 to 30 wt %, and is manufactured by a continuous method.

The solution polymerized styrene-butadiene rubber is excellent in processability although the solution polymerized styrene-butadiene rubber manufactured by the continuous method is disadvantageous in terms of rolling resistance due to a large amount of low molecular material compared to styrene-butadiene rubber manufactured by a batch process, and the solution polymerized styrene-butadiene rubber is excellent in braking performance on a dry road surface or a wet road surface as it has a high hysteresis loss.

The silica may include precipitated silica having a Brunauer-Emmett-Teller (BET) surface area of 160 to 180 $m^2/g$ and a Dibutyl phthalate (DBP) oil absorption amount of 180 to 210 cc/100 g. In this case, as the precipitated silica is easily dispersed, the precipitated silica is advantageous in improvement of anti-abrasion performance, and braking performance on the wet road surface may be further improved.

The silica may be contained in an amount of 90 to 110 parts by weight, specifically 95 to 100 parts by weight with respect to 100 parts by weight of the raw rubber. Braking performance on a wet road surface may be lowered due to a drop in the silica content when the silica is contained in an amount of less than 90 parts by weight with respect to 100 parts by weight of the raw rubber, and it may be difficult to process the raw rubber during a mixing process since the amount of the silica is large when the silica is contained in an amount of more than 110 parts by weight with respect to 100 parts by weight of the raw rubber.

The rubber composition for tire tread comprises modified liquid butadiene rubber instead of a conventional process oil as a softening agent. Therefore, the rubber composition for tire tread may not comprise the process oil besides the modified liquid butadiene rubber. The rubber composition for tire tread may be properly used as an all-season tire tread rubber composition by using the modified liquid butadiene rubber as the softening agent along with a composition of the raw rubber and silica, thereby greatly improving wear performance also while greatly improving braking performance on an ice and snow road surface.

The modified liquid butadiene rubber may be contained in an amount of 20 to 40 parts by weight with respect to 100 parts by weight of the raw rubber. When the modified liquid butadiene rubber is contained in an amount of less than 20 parts by weight with respect to 100 parts by weight of the raw rubber, a process of mixing the raw rubber with the silica may not be smoothly performed, and an effect of improving braking performance on an ice and snow road surface may not be great. Further, when the modified liquid butadiene rubber is contained in an amount of more than 40 parts by weight with respect to 100 parts by weight of the raw rubber, an adverse effect in which braking performance on a wet road surface becomes disadvantageous may occur since mixed rubber has a greatly reduced glass transition temperature.

On the other hand, it may be difficult to synthesize modified liquid butadiene rubber of which both ends of a rubber chain are modified since the modified liquid butadiene rubber has a weight average molecular weight of 5,000 g/mol or more. Further, the modified liquid butadiene rubber having its ends modified also has a problem of increasing an injection amount of the modified liquid butadiene rubber since the modulus is rapidly increased due to an increase in chemical bonding between silicas. Additionally, the modified liquid butadiene rubber having its ends modified may not have improved abrasion resistance due to a decrease in toughness according to an increase in modulus.

In order to solve this problem, modified liquid butadiene rubber according to an embodiment of the present disclosure should be modified within a rubber chain by using one silicate selected from the group consisting of tetramethyl orthosilicate (TMOS), tetraethyl orthosilicate (TEOS), and a mixture thereof, and may have a weight average molecular weight of 5,000 to 50,000 g/mol, a glass transition temperature of −90 to −100° C., and a vinyl content of 10 to 20 wt %. Namely, as the modified liquid butadiene rubber has a very small molecular weight compared to solid butadiene which has conventionally been used as raw rubber, the modified liquid butadiene rubber is a liquid state at room temperature, and the modified liquid butadiene rubber may be used as a softening agent such as process oil which allows raw rubber and silica to be smoothly mixed accordingly.

When the modified liquid butadiene rubber has a weight average molecular weight of less than 5,000 g/mol, the modified liquid butadiene rubber has a small molecular weight so that the modified liquid butadiene rubber has a low tensile strength, and the modified liquid butadiene rubber is easily extracted into an organic matter so that the modified liquid butadiene rubber is disadvantageous in migration to result in a drop in anti-abrasion performance. When the modified liquid butadiene rubber has a weight average molecular weight of more than 50,000 g/mol, the modified liquid butadiene rubber is disadvantageous in processability according to replacement and application of a softening agent, and lowering of abrasion resistance may occur due to a decrease in toughness of the modified liquid butadiene rubber although butadiene chain ends are decreased so that the modified liquid butadiene rubber is advantageous in fuel efficiency performance.

Further, since the modified liquid butadiene rubber has a lower glass transition temperature than the process oil, the modified liquid butadiene rubber may greatly improve braking performance on an ice and snow road surface and may reduce rolling resistance by lowering the glass transition temperature of mixed rubber, thereby decreasing the hardness and modulus of rubber at low temperatures.

Further, the modified liquid butadiene may not lower braking performance on a dry road surface or a wet road surface since the modified liquid butadiene has a high vinyl content compared to solid butadiene having a vinyl content of less than 2 wt %.

In addition, the modified liquid butadiene may improve silica dispersion by hydrophobization of the silica surface compared to non-modified liquid butadiene, and is fixed to a polymer chain so that the modified liquid butadiene may maximize wear performance by reducing a migration phenomenon.

The rubber composition for tire tread may comprise a sulfur vulcanizing agent as a vulcanizing agent. The sulfur vulcanizing agent may include a vulcanizing agent producing element sulfur or sulfur, for example, amine disulfide or polymer sulfur, preferably the element sulfur.

The vulcanizing agent may be used in an amount range of 1.0 to 1.5 part by weight with respect to 100 parts by weight of the raw rubber, and the amount range is preferable since the vulcanizing agent allows the raw rubber to be less sensitive to heat and to be chemically stable as an appropriate vulcanization effect within the range.

Moreover, the rubber composition for tire tread may further comprise 2.0 to 3.0 parts by weight of one selected from the group consisting of amine, disulfide, guanidine, thiourea, thiazole, thiuram, sulfenamide, and combinations thereof as a vulcanization accelerator with respect to 100 parts by weight of the raw rubber.

In addition, the rubber composition for tire tread may further comprise 1 to 5 parts by weight of one selected from the group consisting of N-(1,3-dimethylbutyl)-N'-phenyl-p-phenylenediamine (6PPD), N-phenyl-N'-isopropyl-p-phenylenediamine, N,N'-diphenyl-p-phenylenediamine (3PPD), 2,2,4-trimethyl-1,2-dihydroquinoline (RD), and combinations thereof as an antioxidant with respect to 100 parts by weight of the raw rubber.

It goes without saying that the rubber composition for tire tread may selectively comprise zinc oxide, stearic acid, a coupling agent, or various additives including a processing aid used in an ordinary rubber composition for tire tread in addition to the above-mentioned composition as needed.

The rubber composition for tire tread may be manufactured through an ordinary continuous manufacturing process of two steps. That is, although the rubber composition for tire tread may be prepared inside an appropriate mixer by using a first step (referred to as a nonproduction step) of performing a thermomechanical treatment process or a kneading process at a maximum temperature ranging from 110 to 190° C., preferably at high temperatures of 130 to 180° C. and a second step (referred to as a production step) of performing a mechanical treatment process typically at less than 110° C., for example, at low temperatures of 40 to 100° C. during a finishing step of mixing a crosslinking system, the present disclosure is not limited thereto.

A tire according to the other embodiment of the present disclosure is manufactured by using the rubber composition for tire tread. Since any of the methods may be applicable if methods of manufacturing a tire by using the rubber composition for tire tread are conventional methods used in manufacturing of the tire, detailed description thereof in the present specification is omitted.

The tire may be a passenger car tire, a racing tire, an airplane tire, an agricultural machinery tire, an off-the-road tire, a truck tire, a bus tire, or the like. Further, the tire may be a radial tire or a bias tire, preferably the radial tire.

Hereinafter, Examples of the present disclosure will be described in detail so that the present disclosure can be easily practiced by those skilled in the art to which the present disclosure pertains. However, the present disclosure can be implemented in various different forms and is not limited to the Examples described herein.

Preparation Example: Preparation of Rubber Compositions

Rubber compositions for tire tread according to the following Examples and Comparative Examples were prepared by using the compositions shown in the following Table 1. The rubber compositions were prepared in accordance with an ordinary rubber composition preparing method.

TABLE 1

| | Comparative Example 1 | Comparative Example 2 | Comparative Example 3 | Comparative Example 4 | Comparative Example 5 | Example 1-1 | Example 1-2 | Example 1-3 | Example 1-4 | Example 2-1 | Example 2-2 | Example 2-3 |
|---|---|---|---|---|---|---|---|---|---|---|---|---|
| S-SBR [1] | 100 | 100 | 100 | 100 | 100 | 100 | 100 | 100 | 100 | 100 | 100 | 100 |
| Silica [2] | 100 | 100 | 100 | 100 | 100 | 100 | 100 | 100 | 100 | 100 | 100 | 100 |
| Coupling agent [3] | 8 | 8 | 8 | 8 | 8 | 8 | 8 | 8 | 8 | 8 | 8 | 8 |
| Softening agent [4] | 30 | — | — | — | — | — | — | — | — | — | — | — |
| Lq-BR [5] | — | 30 | — | — | — | — | — | — | — | — | — | — |
| End Fn Lq-BR [11] 5000 | — | — | — | — | 30 | — | — | — | — | — | — | — |
| Fn Lq-BR [6] 26,000 | — | — | 10 | 50 | — | — | — | — | — | 20 | 30 | 40 |
| Fn Lq-BR [7] 5,000 | — | — | — | — | — | 30 | — | — | — | — | — | — |
| Fn Lq-BR [8] 12,000 | — | — | — | — | — | — | 30 | — | — | — | — | — |
| Fn Lq-BR [9] 34,000 | — | — | — | — | — | — | — | 30 | — | — | — | — |
| Fn Lq-BR [10] 45,000 | — | — | — | — | — | — | — | — | 30 | — | — | — |
| Zinc oxide | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| Antioxidant | 1 | 1 | 1 | 1 | 1 | 1 | 1 | 1 | 1 | 1 | 1 | 1 |
| Vulcanizing agent | 0.7 | 1.15 | 1.15 | 1.15 | 1.15 | 1.15 | 1.15 | 1.15 | 1.15 | 1.15 | 1.15 | 1.15 |
| Accelerator (CBS) | 2.2 | 2.65 | 2.65 | 2.65 | 2.65 | 2.65 | 2.65 | 2.65 | 2.65 | 2.65 | 2.65 | 2.65 |
| Accelerator (ZBEC) | 0.2 | 0.2 | 0.2 | 0.2 | 0.2 | 0.2 | 0.2 | 0.2 | 0.2 | 0.2 | 0.2 | 0.2 |
| Accelerator (DPG) | 2.1 | 2.1 | 2.1 | 2.1 | 2.1 | 2.1 | 2.1 | 2.1 | 2.1 | 2.1 | 2.1 | 2.1 |

(Unit: Part by weight)

1) S-SBR is a solution polymerized styrene-butadiene rubber which has a styrene content of 26.5 wt %, a vinyl content within butadiene of 26 wt %, a Moony viscosity of 54 and a glass transition temperature of −48° C., and is manufactured by a continuous method 2) Silica is precipitated silica having a BET surface area of 160 to 180 $m^2/g$ and a DBP oil absorption amount of 180 to 210 cc/100 g 3) A coupling agent has a trade name of Si69 as a sulfide-based silane manufactured by Evonic 4) A softening agent has a trade name of Vivatec 500 as an oil which has a total polycyclic aromatic hydrocarbon (PAH) content of 3 wt % or less and a kinematic viscosity of 95 (210° F. SUS), and in which 25 wt % of an aromatic constituent, 32.5 wt % of a naphthene-based constituent and 47.5 wt % of a paraffin-based constituent are contained 5) Liquid butadiene is a liquid polybutadiene rubber which has a weight average molecular weight of 28,000 g/mol and a vinyl content of 14 wt % and is synthesized to a glass transition temperature of −98° C.

6)~10) Modified liquid butadienes are liquid polybutadiene rubbers which have a vinyl content of 12 wt % and a glass transition temperature of −97° C., which are synthesized to weight average molecular weights of 5,000 g/mol[7], 12,000 g/mol[8], 26,000 g/mol[6], 34,000 g/mol[9] and 45,000 g/mol[10], respectively, and which are modified within a rubber chain by tetraethyl orthosilicate 11) Both end-modified liquid butadiene is a modified liquid butadiene rubber which has a vinyl content of 24 wt %, a glass transition temperature of −80° C. and a weight average molecular weight of 5,000 g/mol, and of which both ends of a chain are modified Experimental Example: Measuring Physical Properties of Prepared Rubber Compositions After measuring Mooney viscosity values, hardness values, 300% modulus values, viscoelastic performance values, and other values of rubber specimens manufactured in the foregoing Examples and Comparative Examples in accordance with ASTM-related regulations and measuring wear performance values of the rubber specimens in accordance with DIN-related regulations, the measurement results are shown in Table 2 below.

Mooney viscosity values (ML1+4(125° C.)) were measured in accordance with ASTM D1646.

Hardness values were measured in accordance with DIN 53505.

300% modulus values were measured in accordance with ISO 37 and ASTM D412.

G', G" and tan δ as viscoelasticity values were measured from −60° C. to 60° C. using an ARES measuring device under 0.5% strain and 10 Hz frequency.

Anti-abrasion performance values were measured in accordance with DIN 53516 by using a DIN abrasion measuring device.

The lower the numerical values of Mooney viscosity in Table 2 as values indicating the viscosity of an unvulcanized rubber, the more excellent the processability of the unvulcanized rubber. The higher the values of hardness as values indicating handling stability, the more excellent the handling stability. The lower the numerical values of −0.30° C. G' as values indicating brake characteristics on an ice and snow road surface, the more excellent the brake characteristics. The higher the numerical values of 0° C. G" as values indicating brake characteristics on a dry road surface or a wet road surface, the more excellent the braking performance. Further, the lower the numerical values of 60° C. tan δ as values indicating rolling resistance properties, the more excellent the wear performance.

Referring to Table 2, it can be seen that the rubber compositions for tire tread prepared in Examples may be used as an all-season tire tread rubber composition by comprising the modified liquid butadiene rubber, thereby greatly improving wear performance also while greatly improving braking performance on the ice and snow road surface.

When comparing Comparative Examples 3 and 4 with Examples 2-1 to 2-3, it can be seen that more excellent braking performance values on the dry road surface or the wet road surface may be obtained, and good wear performance values may be secured by allowing the modified liquid butadiene rubber to satisfy an amount range of 20 to 40 parts by weight with respect to 100 parts by weight of the raw rubber.

TABLE 2

| | Comparative Example 1 | Comparative Example 2 | Comparative Example 3 | Comparative Example 4 | Comparative Example 5 | Example 1-1 | Example 1-2 | Example 1-3 | Example 1-4 | Example 2-1 | Example 2-2 | Example 2-3 |
|---|---|---|---|---|---|---|---|---|---|---|---|---|
| Mooney viscosity | 121 | 108 | 119 | 100 | 96 | 99 | 104 | 123 | 125 | 116 | 110 | 102 |
| Hardness (Shore A) | 71 | 72 | 76 | 72 | 77 | 74 | 74 | 75 | 75 | 76 | 75 | 74 |
| 300% Modulus (Index) | 100 | 98 | 116 | 103 | 121 | 88 | 97 | 124 | 133 | 115 | 113 | 111 |
| Toughness (Index) | 100 | 84 | 70 | 87 | 80 | 94 | 93 | 70 | 59 | 79 | 83 | 86 |
| −30° C. G' (Index) | 100 | 182 | 102 | 200 | 187 | 222 | 212 | 200 | 195 | 202 | 209 | 220 |
| −0° C. G" (Index) | 100 | 85 | 99 | 97 | 102 | 96 | 94 | 95 | 97 | 101 | 102 | 104 |
| 60° C. tanδ (Index) | 100 | 80 | 101 | 107 | 108 | 96 | 101 | 107 | 109 | 103 | 104 | 107 |
| DIN abrasion (Index) | 100 | 120 | 104 | 175 | 115 | 123 | 129 | 131 | 120 | 140 | 154 | 173 |

A rubber composition for tire tread according to the present disclosure may be used as an all-season tire tread rubber composition by greatly improving wear performance also while greatly improving braking performance on an ice and snow road surface.

Hereinabove, exemplary embodiments of the present disclosure have been described in detail. However, the scope of the present disclosure is not limited thereto, but various changes or modified forms of those skilled in the art using a basic concept of the present disclosure defined in the following claims can also be within the scope of the present disclosure.

What is claimed is:

1. A rubber composition for tire tread, the rubber composition comprising:
   100 parts by weight of raw rubber comprising solution polymerized styrene-butadiene rubber which has a styrene content of 20 to 30 wt % and a vinyl content within butadiene of 20 to 30 wt %, and is manufactured by a continuous method;
   90 to 110 parts by weight of silica; and
   20 to 40 parts by weight of modified liquid butadiene rubber wherein the modified liquid butadiene rubber has a weight average molecular weight of 12,000 to 50,000 g/mol, and is modified within a rubber chain by using silicate, wherein the silicate is one selected from the group consisting of tetramethyl orthosilicate (TMOS), tetraethyl orthosilicate (TEOS), and a mixture thereof.

2. The rubber composition for tire tread of claim 1, wherein the modified liquid butadiene rubber a glass transition temperature of −90 to −100° C. and a vinyl content of 10 to 20 wt %.

3. A tire manufactured by using the rubber composition for tire tread according to claim 1.

* * * * *